US012737625B2

(12) United States Patent
Zhu et al.

(10) Patent No.: US 12,737,625 B2
(45) Date of Patent: Sep. 15, 2026

(54) CITATION NETWORK GRAPH REPRESENTATION LEARNING SYSTEM AND METHOD BASED ON MULTI-VIEW CONTRASTIVE LEARNING

(71) Applicant: ZHEJIANG NORMAL UNIVERSITY, Jinhua (CN)

(72) Inventors: Xinzhong Zhu, Jinhua (CN); Huiying Xu, Jinhua (CN); Miaomiao Li, Jinhua (CN); Wenxuan Tu, Jinhua (CN); Hongbo Li, Jinhua (CN); Changwang Zhang, Jinhua (CN); Jianping Yin, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 551 days.

(21) Appl. No.: 18/274,224

(22) PCT Filed: Jun. 15, 2022

(86) PCT No.: PCT/CN2022/098948
§ 371 (c)(1),
(2) Date: Jul. 26, 2023

(87) PCT Pub. No.: WO2022/267953
PCT Pub. Date: Dec. 29, 2022

(65) Prior Publication Data

US 2024/0104376 A1 Mar. 28, 2024

(30) Foreign Application Priority Data

Jun. 24, 2021 (CN) ........................ 202110706945.5

(51) Int. Cl.
*G06N 3/08* (2023.01)

(52) U.S. Cl.
CPC .................................... *G06N 3/08* (2013.01)

(58) Field of Classification Search
CPC ....................................................... G06N 3/08
See application file for complete search history.

(56) References Cited

U.S. PATENT DOCUMENTS 11,967,136 B2 * 4/2024 Sun .................... G06V 10/7747
12,353,835 B2 * 7/2025 Zhang ................... G06F 40/279
(Continued)

FOREIGN PATENT DOCUMENTS

CN 112380435 A 2/2021
CN 112784918 A 5/2021
(Continued)

OTHER PUBLICATIONS

Ye Zhonglin, et al., Network Representation Learning Using the Optimizations of Neighboring Vertices and Relation Model, Journal of Computer Research and Development, 2019, pp. 2562-2577, vol. 56, No. 12.

(Continued)

*Primary Examiner* — David E Choi
(74) *Attorney, Agent, or Firm* — Bayramoglu Law Offices LLC

(57) ABSTRACT

A citation network graph representation learning system and method based on multi-view contrastive learning is provided. The citation network graph representation learning system involved in the present application comprises: a sample construction module, which is configured to construct a corresponding negative sample based on an original graph; a graph enhancement module, which is configured to obtain a positive sample graph and a negative sample graph; a fusion module, which is configured to obtain a consensus representation of the positive sample graph and the negative sample graph by means of a cross view concentration fusion layer; a mutual information estimation module, which is configured to compare learning representations of positive sample pairs and negative sample pairs by means of a (Continued)

discriminator; and a hard sample mining module, which is configured to represent the consistency between the negative sample pairs according to a pre-calculated affinity vector, and select and reserve nodes.

10 Claims, 3 Drawing Sheets

(56) References Cited

U.S. PATENT DOCUMENTS

| | | | | |
|---|---|---|---|---|
| 2021/0192364 | A1* | 6/2021 | Wang | G06N 3/09 |
| 2022/0044105 | A1* | 2/2022 | Amrani | G06F 40/30 |
| 2022/0383108 | A1* | 12/2022 | Cheng | G06N 3/045 |
| 2023/0088676 | A1* | 3/2023 | She | G06N 3/088<br>706/25 |
| 2023/0136527 | A1* | 5/2023 | Zhang | G06F 40/35<br>704/9 |
| 2023/0229963 | A1* | 7/2023 | Iyer | G06N 3/0455<br>706/12 |
| 2023/0306267 | A1* | 9/2023 | Jacob Banville | G06N 3/045 |
| 2024/0104376 | A1* | 3/2024 | Zhu | G06N 3/045 |
| 2024/0119275 | A1* | 4/2024 | Yuan | G06N 3/084 |
| 2024/0144100 | A1* | 5/2024 | Wu | G06N 3/045 |
| 2024/0152816 | A1* | 5/2024 | Wu | G06N 3/045 |
| 2024/0346318 | A1* | 10/2024 | Wu | G06N 3/094 |
| 2024/0354582 | A1* | 10/2024 | Kim | G06N 3/0895 |
| 2025/0077874 | A1* | 3/2025 | Hassani | G06V 10/774 |

FOREIGN PATENT DOCUMENTS

| | | | |
|---|---|---|---|
| CN | 113627463 | A | 11/2021 |
| WO | 2020249961 | A1 | 12/2020 |

OTHER PUBLICATIONS

Qingyun Sun, et al., SUGAR: Subgraph Neural Network with Reinforcement Pooling and Self-Supervised Mutual Information Mechanism, WWW '21, 2021.

Alexander Hermans, et al., In Defense of the Triplet Loss for Person Re-Identification, 2017.

Glen Jeh, et al., Scaling Personalized Web Search, pp. 1-35.

Ganqu Cui, et al., Adaptive Graph Encoder for Attributed Graph Embedding, Proceedings of the 26th ACM SIGKDD Conference on Knowledge Discovery and Data Mining (KDD '20), 2020.

Thomas N. Kipf, et al., Semi-Supervised Classification With Graph Convolutional Networks, ICLR 2017, 2017, pp. 1-14.

Petar Velickovic, et al., Deep Graph Infomax, ICLR 2019, 2019, pp. 1-17.

Kaveh Hassani, et al., Contrastive Multi-View Representation Learning on Graphs, Proceedings of the 37th International Conference on Machine Learning, 2020.

Bryan Perozzi, et al., DeepWalk: Online Learning of Social Representations, KDD'14, 2014.

Aditya Grover, et al., node2vec: Scalable Feature Learning for Networks, KDD'16, 2016.

Thomas N. Kipf, et al., Variational Graph Auto-Encoders, ArXiv, 2016, pp. 1-3.

Zhen Peng, et al., Graph Representation Learning via Graphical Mutual Information Maximization, International World Wide Web Conference Committee (WWW '20), 2020.

Petar Velickovic, et al., Graph Attention Networks, ICLR 2018, 2018, pp. 1-12.

Yuning You, et al., When Does Self-Supervision Help Graph Convolutional Networks?, Proceedings of the 37th International Conference on Machine Learning, 2020.

* cited by examiner

CITATION NETWORK GRAPH REPRESENTATION LEARNING SYSTEM AND METHOD BASED ON MULTI-VIEW CONTRASTIVE LEARNING

CROSS REFERENCE TO RELATED APPLICATIONS

This application is the national stage entry of International Application No. PCT/CN2022/098948 filed Jun. 15, 2022, and which is based upon and claims priority to Chinese Patent Application No. 202110706945.5 filed Jun. 24, 2021, the entire contents of which are incorporated by reference herein.

TECHNICAL FIELD

The present application relates to the technical field of graph representation learning for a citation network, and in particular to a citation network graph representation learning system and method based on multi-view contrastive learning.

BACKGROUND

With the development of informatization, the continuous increase of storage space, and the continuous expansion of Internet user groups, a large amount of literature information is generated every day. How to use the literature to better serve different technical industries and a large number of groups has become the focus of researchers. A citation network refers to a collection of citation and cited relationships among literature. The literature includes scientific journals, patent documents, conference proceedings, scientific reports, academic papers, and the like. A large amount of English data exists in various applications in real life, and analysis of these data in different dimensions can help users understand the data structure of different types of literature, the development of scientific fields, the relationship between disciplines, and the like. Graph machine learning is the most commonly used technology to effectively represent citations, and it plays a great role in citation network structure analysis, citation network node feature extraction, and the like.

The network graph representation information needs to include high-dimensional feature representations related to surrounding neighbors and high-dimensional feature representations of the global graph in addition to high-dimensional representations of its own attribute information. In practical applications, the cost of acquiring the data of the marked citation network is very high. Therefore, unsupervised graph representation learning emerges as the times require, which refers to the study of an encoder that learns a node representation to store the attribute and structural information of the graph without the guidance of artificial label information. The unsupervised graph representation learning represents the vertices in the graph as low-dimensional vectors by reserving the network topology and node content information of the graph, so that machine learning algorithms can process these low-dimensional vectors. The essence of the unsupervised graph representation learning is that nodes in the graph are represented in a low-dimensional, real-valued and dense vector form, so that the nodes can have strong representation and reasoning capabilities in a vector space. Among all unsupervised graph representation learning methods for a citation network, the contrastive learning-based method achieves impressive performance.

Comparative learning technology is introduced into graph neural network (GNN) and has shown robust performance in unsupervised graph representation learning. These methods can be broadly divided into two types, namely, a node-graph level and a node-node level.

Node-graph level representation learning methods. Such methods aim to predict the consistency between the node representation and the graph digest, forcing all nodes to reserve mutual information with global features. For example, depth graph information (DGI) estimates the similarity of each single node and global node to learn that mutual information (MI) is maximized by mutually capturing representative node features of global information content of the whole graph. Similarly, Tang et al. [Qingyun Sun, Hao Peng, Jianxin Li, Jia Wu, Yuanxing Ning, Philip S. Yu, and Lifang He. 2021. SUGAR: Subgraph Neural Network with Reinforcement Pooling and Self-Supervised Mutual Information Mechanism. In Proceedings of the International Conference on World Wide Web] proposed a self-supervised MI mechanism to enhance its attention to the structural properties of the global graph by maximizing the MI of subgraph representations. Recently, MVGRL proposed to enhance the input graph by using graph diffusion, and then estimate the MI maximization between nodes and cross-view representations of the graph.

Node-node level representation learning methods. Unlike the node-graph pattern, these methods directly maximize the MI between two representations (e.g., the input and output of an encoder) at the fine-grained node level to reserve the basic topology and property information in the input graph. For example, graph mutual information (GMI) proposes a node-to-node contrastive scheme for graph representation learning to jointly maximize edge MI and feature MI. Furthermore, GraphCL first generates two correlated graph views by randomly performing node perturbations, and then learns a representation of the graph by directly maximizing the node-level consistency between dual-source representations. In addition, the GCA considers augmented views of graph data in an adaptive manner and simplifies previous node graph contrast schemes by defining contrast targets at the node level.

However, these GCL-based methods usually employ a single-range MI estimation scheme to learn graph representations that are insufficient to represent the attribute information of the original graph, resulting in suboptimal performance.

The hard sample mining refers to classifying samples by using a classifier, putting the misclassified samples (hard negative) into a negative sample set, and continuing to train the classifier. In particular, a hard sample perception-based deep cascade representation model (HDCE) integrates a set of modules with different complexity in a cascading manner, while mining the hard samples from a multi-level perspective. He et al. [Alexander Hermans, Lucas Beyer, and Bastian Leibe. 2017. In Defense of the Triplet Loss for Person Re-Identification.ArXiv abs/1703.07737] selected the hardest positive and negative samples through a well-designed triplet loss to improve the performance of metric representation learning for person re-identification. A stochastic hard negative mining (SHNM) method is introduced to adopt class signatures of online tracked feature representations and use the signatures to identify hard negative instance candidates. Although hard sample mining schemes are proven to be key operations to enhance the discriminability of latent representations in various deep representation learning tasks, these schemes are rarely studied in the field of graph representation learning.

Better performance enhancements are achieved with MI estimation in existing GCL-based frameworks, but it is observed that these methods usually estimate the mutual information between node-graph level or node-node level representations based on all nodes. The mutual information evaluation method has the following two problems that 1) the graph structure information is only paid attention from a single perspective, and the position information of the subgraph structure in different ranges is ignored; and 2) all node information is extracted without distinction, consequently, hard samples are not easy to distinguish. In this way, the network generally prefers to fit overall or extremely local graph representations, and confusion may occur when hard nodes are identified, which may result in inaccurate similarity estimation between node representations, and the learned graph representation has limited identification capability.

SUMMARY

For the defects of the prior art, an objective of the present application is to provide a citation network graph representation learning system and method based on multi-view contrastive learning, which maximizes access to richer structural information in a hierarchical manner by estimation, so as to achieve more comprehensive graph representation learning. In particular, since the reservation of multi-range structure information is proved to be crucial for representation learning, a new multi-view contrastive learning framework with a hierarchy graph Infmax is introduced, so that node representation can reflect the information of global nodes, adjacent nodes and single node in different views to the maximum extent. In this way, complementary structure information can be uniformly encoded from different ranges to improve the quality of the graph representation. In addition, with the improvement of the contrast fine granularity, a hard sample mining module based on mutual information is designed to force a network to pay more attention to the sample pairs which are difficult to distinguish. Thus, the resulting network will be able to reveal the intrinsic structural information of the hard nodes in sequence to enhance the identification capability of each discriminator.

In order to achieve the above objective, the present application uses the following technical solutions.

A citation network graph representation learning system based on multi-view contrastive learning comprises:

- a sample construction module configured to take a corresponding original graph node representation in a citation network graph as a positive sample, and construct a corresponding negative sample based on an original graph;
- a graph enhancement module configured to enhance a graph structure and an initial node feature of the positive sample based on a personalized page ranking algorithm and a Laplacian smoothing algorithm, so as to obtain a positive sample graph and a negative sample graph related to a positive sample node set;
- a fusion module configured to extract a positive sample graph representation and a negative sample graph representation based on a GCN encoder, integrate the positive sample graph representation and the negative sample graph representation, and obtain a consensus representation of the positive sample graph and the negative sample graph by means of a cross view concentration fusion layer;
- a mutual information estimation module configured to compare learning representations of positive sample pairs constructed by nodes in the positive sample graph and negative sample pairs constructed by nodes in the negative sample graph by means of a discriminator; and
- a hard sample mining module configured to represent the consistency between the negative sample pairs according to a pre-calculated affinity vector, and select and reserve nodes that have more difficulty in expressing global or neighbor information according to the calculated and obtained affinity vector, so as to achieve more comprehensive graph representation learning.

Further, the comparing learning representations of the positive sample graph and the negative sample graph by means of a discriminator by a mutual information estimation module is specifically as follows: comparing learning representations of the positive sample pairs and the negative sample pairs by means of node-graph level, node-neighbor level, and node-node level.

Further, the comparing learning representations of the positive sample pairs and the negative sample pairs by means of the node-graph level is specifically as follows:

encoding global information of the positive sample graph by using an R function, which is represented as:

$$s^v = R(Z^v)$$

wherein $Z^v$ represents a positive sample graph representation of the $v^{th}$ view extracted by a graph encoder;

calculating a probability score assigned to the positive sample graph, which is represented as:

$$D(z_i, s^v) = \sigma\left(z_i^T W s^v\right)$$

wherein D represents a discriminator; $z_i$ represents a positive sample;

$$z_i^T$$

represents node information for encoding; $s^v$ represents global information of positive sample pairs for encoding; $\sigma$ represents an activation function; and w represents a learnable tensor;

calculating mutual information between the positive sample pairs and mutual information between the negative sample pairs in all views, which is represented as:

$$L_{graph} = -\frac{1}{N+M}\sum_{v=1}^{v}\left(\sum_{i=1}^{N}E_{(X^v,A^v)}[\log D(z_i, s^v)] + \sum\nolimits_{i=1}^{M}E_{\left(\hat{x^v},A^v\right)}[\log(1-D(\hat{z}_i, s^v))]\right)$$

wherein $$\sum\nolimits_{i=1}^{N}E_{(X^v,A^v)}[\log D(z_i, s^v)]$$

represents the affinity between nodes and the whole graph;

$$\sum_{i=1}^{M} E_{\left(\hat{X}^{v}, A^{v}\right)}[\log(1 - D(\hat{z}_i, s^{v}))]$$

represents a difference between any node and the whole graph; V represents the number of views; N and M represent the number of positive sample pairs and negative sample pairs, respectively; $X^v$ represents a feature matrix of the $v^{th}$ view; $A^v$ represents an adjacency matrix of the $v^{th}$ view; $\widehat{X^v}$ represents a reconstructed feature matrix of the $v^{th}$ view; and $\hat{Z}_1$ represents a negative sample.

Further, the comparing learning representations of the positive sample pairs and the negative sample pairs by means of the node-neighbor level is specifically as follows:

selecting a local structure A'v of nodes, enhancing the $v^{th}$ graph representation Z'v of the selected node, and calculating a local structure of the enhanced and selected node representation, which is represented as:

$$H'^{v} = \sigma(A'^{v} Z'^{v})$$

wherein H'v represents the local structure of the enhanced and selected node representation; and σ represents an activation function;

calculating mutual information between the positive sample pairs and mutual information between the negative sample pairs in all views, which is represented as:

$$L_{neighbor} = -\frac{1}{N' + M'} \sum_{v=1}^{V}\left(\sum_{i=1}^{N'} E_{(X'^{v}, A'^{v})}\left[\log D\left(z_i', h_j^{v\prime}\right)\right] + \sum_{i=1}^{M'} E_{\left(\hat{X'^{v}} A'^{v}\right)}\left[\log\left(1 - D\left(\hat{z}_i', h_j'^{v}\right)\right)\right]\right)$$

wherein N' represents the number of sampled positive samples; M' represents the number of sampled negative samples; $X'^v$ represents a sampled feature matrix of the $v^{th}$ view; $A'^v$ represents a sampled adjacency matrix of the $v^{th}$ view; $\widehat{X'^v}$ represents a sampled reconstructed feature matrix of the $v^{th}$ view; $z_i'$ represents a positive sample node representation in the $v^{th}$ view;

$$h_j^{v\prime}$$

represents adjacent digests corresponding to node representations in the $v^{th}$ view;

$$\hat{z}_i'$$

represents a negative sample node representation in the $v^{th}$ view; and $$h_j'^{v}$$

represents node neighbor information.

Further, the comparing learning representations of the positive sample pairs and the negative sample pairs by means of the node-node level is specifically as follows:

normalizing and representing the $v^{th}$ graph representation $Z^v$ by using an activation function, and calculating mutual information between graph representations of nodes, which is represented as:

$$L_{vector} = -\frac{1}{N'' + M''} \sum_{v=1}^{v}\left(\sum_{i=1}^{N''} E_{(X''^{v}, A''^{v})}[\operatorname{Log} D(z_i'', \sigma(z_k''^{v}))] + \sum_{k=1}^{M''} E_{\left(\hat{X''^{v}}, A''^{v}\right)}[\log(1 - D(\hat{z_{k''}}, \sigma(z_k''^{v})))]\right)$$

wherein N" represents the number of subsampled positive samples; M" represents the number of subsampled negative samples; $X''^v$ represents a subsampled feature matrix of the $v^{th}$ view; $A''^v$ represents a subsampled adjacency matrix of the $v^{th}$ view; $z''_i$ represents a subsampled center node representation;

$$z_k''^{v}$$

represents a subsampled node representation; $\widehat{X''^v}$ represents a subsampled reconstructed feature matrix of the $v^{th}$ view; and $\widehat{z_k''}$ representing a subsampled negative node representation.

Further, the representing the consistency between the negative sample pairs according to a pre-calculated affinity vector, and selecting and reserving nodes that have more difficulty in expressing global or neighbor information according to the calculated and obtained affinity vector by a hard sample mining module to achieve more comprehensive graph representation learning is specifically as follows:

giving mutual information scores of positive sample pairs and negative sample pairs of two views for vectors, and performing linear combination operations on the vectors corresponding to the positive sample pairs and the negative sample pairs to obtain a consistent mutual information estimation vector, which is represented as:

$$s_{pos} = \alpha s_{pos1} + (1 - \alpha) s_{pos2}$$

$$s_{neg} = \alpha s_{neg1} + (1 - \alpha) s_{neg2}$$

wherein Spos and Sneg represent sub-vectors of the fused mutual information consistency; and α represents a learnable coefficient;

defining true labels of the positive sample pairs and negative sample pairs as 1 and 0, respectively;

sorting all nodes according to the affinity vector, and defining a node of top-K as a hard node according to an index of all nodes, which is represented as:

$$idx = \text{Top\_rank}((s_{neg} - s_{pos}), K)$$

wherein idx represents an index slice;

selecting positive sample pairs and negative sample pairs, which are represented as:

$$\bar{p}^{+} = p_{idx}^{+}, \bar{p}^{-} = p_{idx}^{-}$$

wherein $$p_i^{-} = (\hat{z}_i, x_i)$$

represents negative example pairs;

$$p_i^{+} = (z_i, x_i)$$

represents positive sample pairs; $x_i$ represents a pre-assigned representation;

$$p_{idx}^{+}$$

represents positive sample pairs; and $$\overline{p_{idx}}$$

represents negative sample pairs.

Further, the citation network graph representation learning system based on multi-view contrastive learning further comprises: an optimization module configured to optimize learning representation of the comparative positive sample pairs and negative sample pairs at the node-graph level, node-neighbor level, and node-node level, wherein an optimized loss function is:

$$L = L_{graph} + \lambda L_{neighbor} + \gamma L_{vertex}$$

wherein $\lambda$ and $\gamma$ represent predefined hyper-parameters.

Further, the GCN encoder in the fusion module is represented as:

$$f^{v}(\cdot):Z^{v} = f^{v}(G^{v}) = f^{v}(X^{v}, A^{v})$$

wherein $f^{v}(\cdot)$ represents an encoder; and $G_v$ represents an original graph set.

Further, before all nodes are sorted according to the affinity vector, a set of affinity vectors are obtained by subtracting Spos from Sneg.

Correspondingly, further provided is a citation network graph representation learning method based on multi-view contrastive learning, which comprises:

S1: taking a corresponding original graph node representation in a citation network graph as a positive sample, and constructing a corresponding negative sample based on an original graph;

S2: enhancing a graph structure and an initial node feature of the positive sample based on a personalized page ranking algorithm and a Laplacian smoothing algorithm, so as to obtain a positive sample graph and a negative sample graph related to a positive sample node set;

S3: extracting a positive sample graph representation and a negative sample graph representation based on a GCN encoder, integrating the positive sample graph representation and the negative sample graph representation, and obtaining a consensus representation of the positive sample graph and the negative sample graph by means of a cross view concentration fusion layer;

S4: comparing learning representations of positive sample pairs constructed by nodes in the positive sample graph and negative sample pairs constructed by nodes in the negative sample graph by means of a discriminator; and

S5: representing the consistency between the negative sample pairs according to a pre-calculated affinity vector, and selecting and reserving nodes that have more difficulty in expressing global or neighbor information according to the calculated and obtained affinity vector, so as to achieve more comprehensive graph representation learning.

Compared with the prior art, the present application has the following beneficial effects:

1) processing graph representation learning more naturally in unsupervised scenarios: L loss accomplishes graph contrastive learning by exploring information from the data itself without any label guidance;

2) better comprehensiveness: The internal structure information of the whole graph is revealed in a hierarchical way. Instead of performing graph mutual information operations in a fixed mode, the framework implicitly estimates mutual information from different ranges, thereby extracting more comprehensive information by gradually exploiting node-graph level, node-neighbor level and node-node level relationships; and 3) better discriminability: the learning process of hierarchical mutual information estimation and mutual information-based hard sample mining is unified, so that nodes that are easy to distinguish are filtered, the network pays more attention to the hard nodes, and the discrimination capability of the network is improved.

DETAILED DESCRIPTION OF THE EMBODIMENTS

The following describes the embodiments of the present application by specific examples, and other advantages and effects of the present application will be readily apparent to those skilled in the art from the disclosure of the present application. The present application can also be implemented or applied through other different specific embodiments, and various modifications or changes can be made to the details in this specification based on different viewpoints and applications without departing from the spirit of the present application. It should be noted that the following embodiments and features in the embodiments can be combined with each other without conflict.

For the defects of the prior art, an objective of the present application is to provide a citation network graph representation learning system and method based on multi-view contrastive learning.

Embodiment 1

Figure 1:
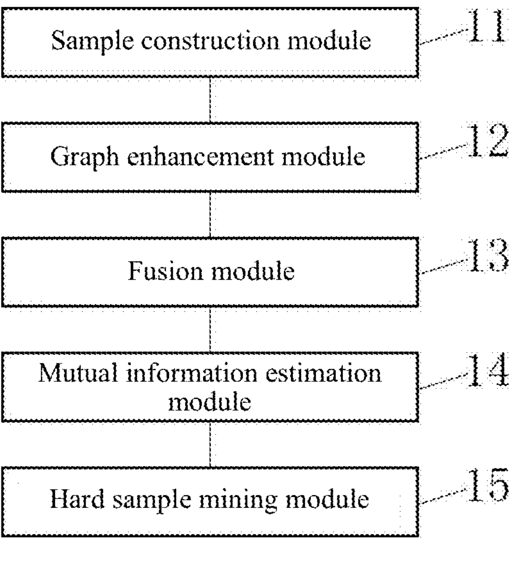
FIG. 1 is a diagram of a structure of a citation network graph representation learning system based on multi-view contrastive learning according to Embodiment 1.

This embodiment, referring to FIG. 1, provides a citation network graph representation learning system based on multi-view contrastive learning, which comprises:

- a sample construction module 11 configured to take a corresponding original graph node representation in a citation network graph as a positive sample, and construct a corresponding negative sample based on an original graph;
- a graph enhancement module 12 configured to enhance a graph structure and an initial node feature of the positive sample based on a personalized page ranking algorithm and a Laplacian smoothing algorithm, so as to obtain a positive sample graph and a negative sample graph related to a positive sample node set;
- a fusion module 13 configured to extract a positive sample graph representation and a negative sample graph representation based on a GCN encoder, integrate the positive sample graph representation and the negative sample graph representation, and obtain a consensus representation of the positive sample graph and the negative sample graph by means of a cross view concentration fusion layer;
- a mutual information estimation module 14 configured to compare learning representations of positive sample pairs constructed by nodes in the positive sample graph and negative sample pairs constructed by nodes in the negative sample graph by means of a discriminator; and
- a hard sample mining module 15 configured to represent the consistency between the negative sample pairs according to a pre-calculated affinity vector, and select and reserve nodes that have more difficulty in expressing global or neighbor information according to the calculated and obtained affinity vector, so as to achieve more comprehensive graph representation learning.

This embodiment proposes a new multi-view GCL-based framework, wherein the multi-graph contrastive learning (GCL) framework follows the general GCL paradigm, called multi-view hierarchical graph Infomax (MHGI), and the network learns the representation of the graph by maximizing the mutual information in the corresponding representation. This framework is used for unsupervised graph representation learning, fuses information from different views, and performs graph Infmax in a hierarchical manner to improve the quality of the graph representation.

In the sample construction module 11, a corresponding original graph node representation in a citation network graph is taken as a positive sample, and a corresponding negative sample is constructed based on an original graph.

The original graph in the citation network is acquired, the nodes of the original graph G {X, A} are represented as positive samples, and the positive samples are scrambled by an explicit function according to a row scrambling sequence to obtain corresponding negative samples.

Unlike the existing single sample pair construction mode, this embodiment establishes three combinations, namely, node-graph level, node-neighbor level and node-node level modes, to construct positive sample pairs and negative sample pairs.

In the graph enhancement module 12, a graph structure and an initial node feature of the positive sample are enhanced based on a personalized page ranking algorithm and a Laplacian smoothing algorithm, so as to obtain a positive sample graph and a negative sample graph related to the positive sample node set.

The graph structures and initial node features in the positive samples are enhanced by the personalized page ranking (PPR) algorithm [Glen Jeh and Jennifer Widom. 2003. Scaling personalized web search. In Proceedings of the International Conference on World Wide Web. 271-279] and a Laplacian smoothing algorithm [Ganqu Cui, Jie Zhou, Cheng Yang, and Zhiyuan Liu. 2020. Adaptive Graph Encoder for Attributed Graph Embedding. In Proceedings of the ACM SIGKDD Conference on Knowledge Discovery and Data Mining. 976-985] to obtain a positive sample graph $G^v$ in the positive sample set V and corresponding negative sample Graph GbY.

In the fusion module 13, a positive sample graph representation and a negative sample graph representation are extracted based on a GCN encoder, the positive sample graph representation and the negative sample graph representation are integrated, and a consensus representation of the positive sample graph and the negative sample graph is obtained by means of a cross view concentration fusion layer.

A GCN-based encoder $f^v(\cdot)$: $Z^v=f^v(G^v)=f^v(X^v,A^v)$ extracts the positive sample graph representation $Z^v$ and an enhanced corresponding negative sample graph representation $G^v$b$Z^v$. The multi-view latent-space representations of the positive samples and the negative samples are then element-level accumulated in a linear fusion to obtain a consensus representation ZBZ.

In the mutual information estimation module 14, learning representations of positive sample pairs constructed by nodes in the positive sample graph and negative sample pairs constructed by nodes in the negative sample graph are compared by means of a discriminator.

The construction of the positive sample pairs and the negative sample pairs is constructed by nodes in the positive sample graph and negative sample graph.

The positive sample pairs and the negative sample pair are compared by using three discriminators based on parameter sharing, wherein the consistency of the positive sample pairs and the negative sample pair is determined by mutual information (MI) estimation among different views. According to this principle, graph mutual information maximization is performed in the node representation to generate a graph representation capable of reflecting the whole graph multi-range structure information to the maximum extent.

Figure 2:
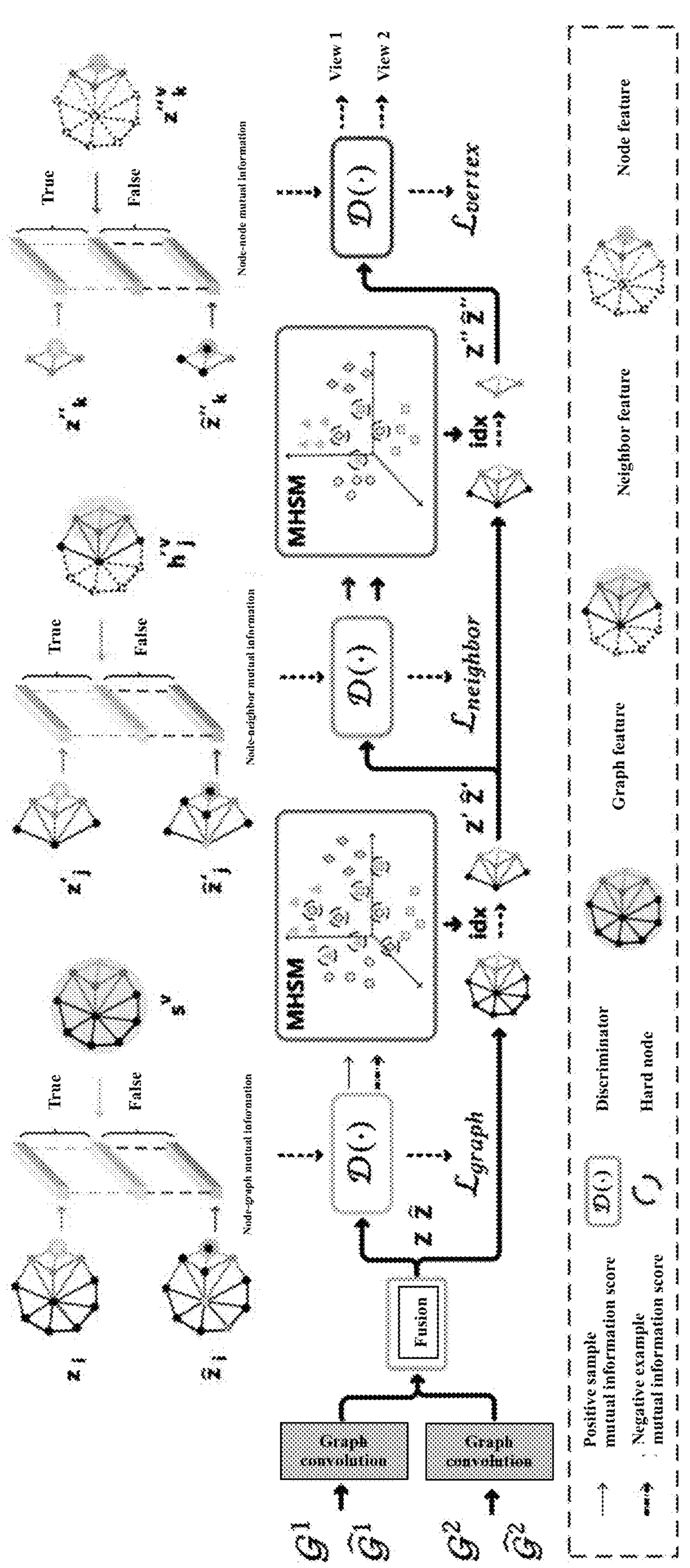
FIG. 2 is a diagram of a framework of a citation network graph representation learning system based on multi-view contrastive learning according to Embodiment 1.

In order to fully maintain the multi-range structural features and information, this embodiment estimates mutual information in a hierarchical manner, namely, node-graph level, node-neighbor level and node-node level, to compare the learning representation of the positive sample pairs and the negative sample pairs. The overall structure of the hierarchical mutual information estimation is shown in FIG. 2.

Maximization of node-graph level mutual information, wherein a learning process of maximizing the node-graph level mutual information comprises the following three steps:

1. giving a graph representation $Z^v$ of the $v^{th}$ view extracted by the graph encoder, and encoding global information of the positive sample graph $G^v$ by using an R function, which is represented as:

$$s^v = R(Z^v)$$

wherein $Z^v$ represents a positive sample graph representation of the $v^{th}$ view extracted by a graph encoder;

2. for any node $n_i$, regarding the graph representation $z_i$ from Z as one positive sample. The corresponding negative sample of this positive sample is represented as $$z_i^T.$$

Then, a discriminator D, i.e., a simple bilinear function is used, which can make the logarithmic value of positive samples as large as possible and the logarithmic value of the negative samples as small, and the probability score assigned to the positive sample graph is further calculated, which is represented as:

$$D(z_i, s^v) = \sigma\left(z_i^T W s^v\right)$$

wherein D represents a discriminator; $z_i$ represents a positive sample;

$$z_i^T$$

represents a transpose matrix of an incremental sample; $s^v$ represents global information of positive sample pairs for encoding; σ represents an activation function; and w represents a learnable tensor;

3. with a hierarchical way, the mutual information among the positive sample pairs ($z_i$, $S^v$) can be maximized to the maximum extent, and the mutual information among the negative sample pairs ($\hat{z}_i$, $s^v$) in all the views can be minimized.

Therefore, mutual information between the positive sample pairs and mutual information between the negative sample pairs in all views is calculated, which is represented as:

$$L_{graph} = -\frac{1}{N+M}\sum_{v=1}^{V}\left(\sum_{i=1}^{N} E_{(X^v, A^v)}[\log D(z_i, s^v)] + \sum\nolimits_{i=1}^{M} E_{\left(\hat{X}^v, A^v\right)}[\log(1 - D(\hat{z}_i, s^v))]\right)$$

wherein $$\sum\nolimits_{i=1}^{N} E_{(X^v, A^v)}[\log D(z_i, s^v)]$$

represents the affinity between nodes and the whole graph;

$$\sum\nolimits_{i=1}^{M} E_{\left(\hat{X}^v, A^v\right)}[\log(1 - D(\hat{z}_i, s^v))]$$

represents a difference between any node and the whole graph, so that the learned nodes are forced to capture and store global information as much as possible; V represents the number of views; N and M represent the number of positive sample pairs and negative sample pairs, respectively; $X^v$ represents a feature matrix of the $v^{th}$ view; $A^v$ represents an adjacency matrix of the $v^{th}$ view; $\widehat{X^v}$ represents a reconstructed feature matrix of the $v^{th}$ view; and $\hat{z}_i$ represents a negative sample.

The maximization of mutual information at the node-neighbor level is opposite to the maximization of mutual information at the node-graph level, and the exploration of an association relationship between the node and the neighbor node is beneficial to coding rich local structure information. As in the following formula, the process of node-neighbor level mutual information estimation comprises two steps:

1. selecting a local structure A'v of nodes, enhancing the $v^{th}$ graph representation Z'v of the selected node, and calculating a local structure of the enhanced and selected node representation, which is represented as:

$$H'^v = \sigma(A'^v Z'^v)$$

wherein H'v represents the local structure of the enhanced and selected node representation; and σ represents an activation function;

2. for positive sample pairs, maximizing the mutual information between the node representation $$z'_j$$

of node $n_j$ and its corresponding adjacent digest $$h_j^{v\prime}$$

in the $v^{th}$ view. The minimization process of the mutual information in the negative sample pairs is similar to that in the node-graph level.

Therefore, mutual information between the positive sample pairs and mutual information between the negative sample pairs in all views is calculated, which is represented as:

$$L_{neighbor} = -\frac{1}{N'+M'}\sum_{v=1}^{V}\left(\sum_{i=1}^{N'} E_{(X'^v, A'^v)}\left[\log D\left(z'_i, h_j^{v\prime}\right)\right] + \sum\nolimits_{i=1}^{M'} E_{\left(\widehat{X'^v}, A'^v\right)}\left[\log\left(1 - D\left(\hat{z}'_i, h_j^{v\prime}\right)\right)\right]\right)$$

wherein N' represents the number of sampled positive samples; M' represents the number of sampled negative samples; $X'^v$ represents a sampled feature matrix of the $v^{th}$ view; $A'^{v}$ represents a sampled adjacency matrix of the $v^{th}$ view; $\widehat{X'^{v}}$ represents a sampled reconstructed feature matrix of the $v^{th}$ view; $z_i'$ represents a positive sample node representation in the $v^{th}$ view;

$$h_j^{v\prime}$$

represents adjacent digests corresponding to node representations in the $v^{th}$ view;

$$\hat{z}_i'$$

represents a negative sample node representation in the $v^{th}$ view; and $$h_j^{\prime v}$$

represents neighbor information.

By comparing all positive sample pairs and negative sample pairs, the network enhances the representation of the nodes among different views, and therefore, the representation of the graph can capture more latent local structural information.

The node-node level mutual information maximization specifically comprises the following steps:

to discover the unique information in each view, first normalizing and representing the $v^{th}$ graph representation $Z^v$ by using an activation function, and then maximizing representation $z_k$ of the node $n_k$ through node-node level mutual information while collecting the unique information of the different views. This mutual information enables the nodes to represent fine information about preferences across the multi-view data itself.

Therefore, mutual information between graph representations of nodes is calculated, which is represented as:

$$L_{vector} = -\frac{1}{N'' + M''}\sum_{v=1}^{v}\left(\sum_{i=1}^{N''} E_{(X''^{v},A''^{v})}\left[\log D\left(z_j'', \sigma(z_k''^{v})\right)\right] + \sum_{k=1}^{M''} E_{(\widehat{X''^{v}},A''^{v})}\left[\log\left(1 - D\left(\widehat{z_k}'', \sigma\left(z_k''^{v}\right)\right)\right)\right]\right)$$

wherein N" represents the number of subsampled positive samples; M" represents the number of subsampled negative samples; $X''^{v}$ represents a subsampled feature matrix of the $v^{th}$ view; $A''^{v}$ represents a subsampled adjacency matrix of the $v^{th}$ view; $z''_i$ represents a subsampled center node representation;

$$z_k''^{v}$$

represents a subsampled node representation; $\widehat{X''^{v}}$ represents a subsampled reconstructed feature matrix of the $v^{th}$ view; and $\widehat{z_k}''$ representing a subsampled negative node representation.

In the hard sample mining module 15, the consistency between the negative sample pairs is represented according to a pre-calculated affinity vector, and nodes that have more difficulty in expressing global or neighbor information are selected and reserved according to the calculated and obtained affinity vector, so that more comprehensive graph representation learning is achieved.

Figure 3:
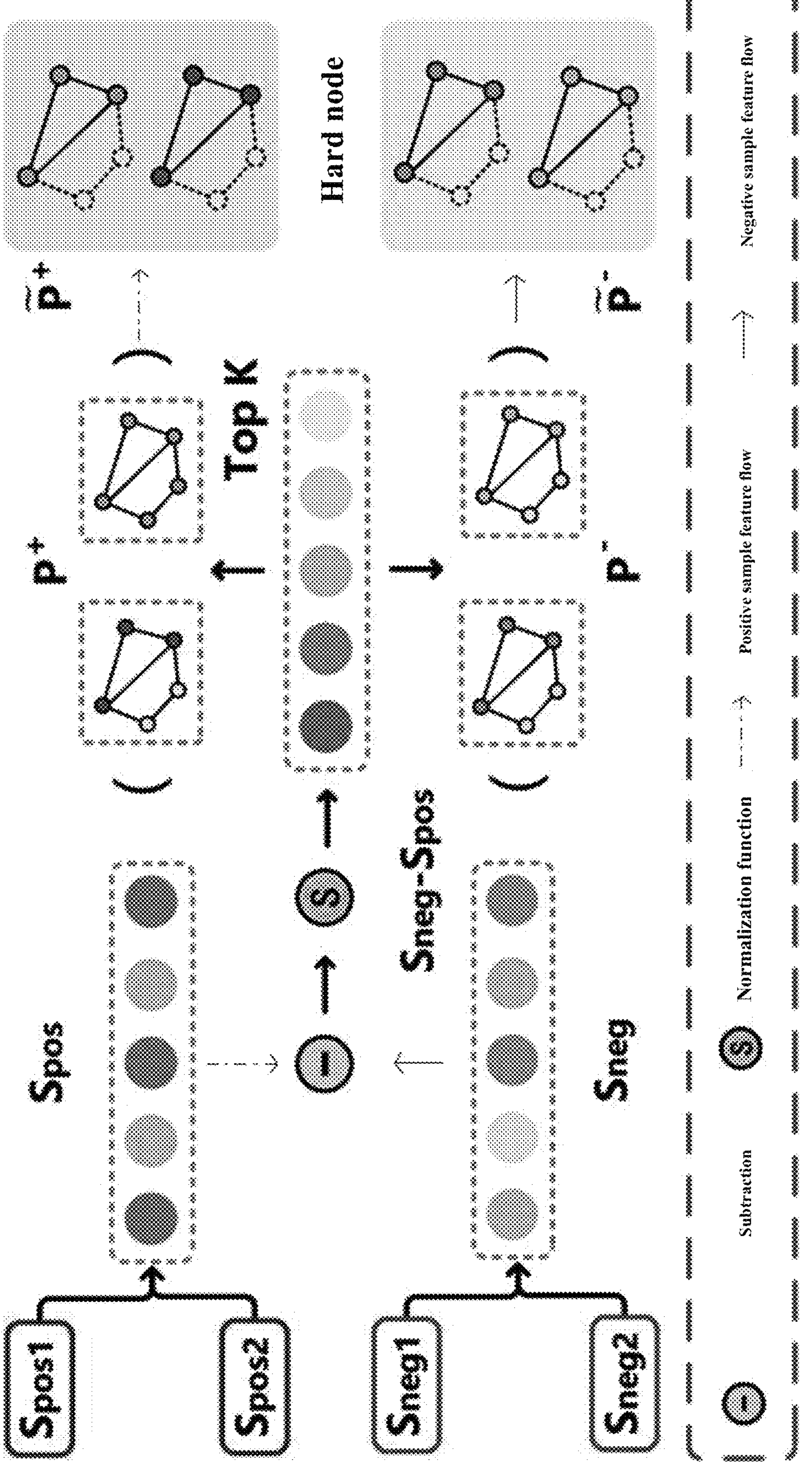
FIG. 3 is a schematic diagram of a hard sample mining module based on mutual information according to Embodiment 1.

Since hard nodes often confuse the graph representation, treating all nodes equally limits the discriminability of the resulting graph representations. In these nodes that are not easily distinguished, it is important to introduce as much discrimination information as possible. Therefore, this embodiment provides a new mutual information-based hard sample mining module, so that the network can pay more attention to the hard sample pairs. The general structure of the mutual information-based hard sample mining module is shown in FIG. 3, and comprises the following four steps:

1. giving mutual information scores of positive sample pairs and negative sample pairs of two views for vectors, and performing linear combination operations on the vectors corresponding to the positive sample pairs and the negative sample pairs to obtain a set of consistent mutual information estimation vectors, which are represented as:

$$s_{pos} = \alpha s_{pos1} + (1-\alpha)s_{pos2}$$

$$s_{neg} = \alpha s_{neg1} + (1-\alpha)s_{neg2}$$

wherein Spos and Sneg represent sub-vectors of the fused mutual information consistency, which reflects the consistency of the full interaction between the representations of the positive sample pairs and the representations of the negative sample pairs; α represents a learnable coefficient that selectively determines the importance of two information sources. α is initialized to 0.5, and then a gradient descent method is used for automatically adjusting the network;

2. defining true labels of the positive sample pairs and negative sample pairs as 1 and 0, respectively;

wherein the goal is to train the network by calculating a contrast objective (i.e., a loss function like cross entropy) and make the predicted scores Spos and Sneg of the positive sample pairs and negative sample pairs closer to their corresponding true labels. Intuitively, a hard node $n_i$ is based on a latent assumption that the prediction score for positive sample pairs $$p_i^+ = (z_i, x_i)$$

is close to 0 and the predicted score for negative sample pairs $$p_i^- = (\hat{z}_i, x_i)$$

is close to 1. Following this assumption, a set of affinity vectors are obtained by subtracting Spos from Sneg, and are used to measure the difference in consistency between $$p_i^- \text{ and } p_i^+$$

of nodes $n_i$.

3. sorting all nodes according to the affinity vector, and defining a node of top-K as a hard node according to an index of all nodes, which is represented as:

$$idx = \text{Top\_rank}((s_{neg} - s_{pos}), K)$$

wherein idx represents an index slice;

4. selecting positive sample pairs and negative sample pairs by following equation, which are represented as:

$$\bar{p}^+ = p^+_{idx}, \bar{p}^- = p^-_{idx}$$

wherein $$p_i^- = (\hat{z}_i, x_i)$$

represents negative example pairs;

$$p_i^+ = (z_i, x_i)$$

represents positive sample pairs; $x_i$ represents a pre-assigned representation;

$$p^+_{idx}$$

represents positive sample pairs; and $$\overline{p_{idx}}$$

represents negative sample pairs.

In general, a mutual information-based hard sample mining module is a new method for selecting confusable nodes based on the results of mutual information estimation. In this way, the discriminability of any node can be evaluated according to the node-graph level or node-neighbor level dependencies; and the identification capability of the network is improved by selecting the hard nodes and further disclosing the inherent structural information of these nodes; furthermore, the module and proposed hierarchical mutual information estimation seamlessly cooperate in a unified framework to reserve more information to improve network and graph representation discrimination.

In this embodiment, the citation network graph representation learning system based on multi-view contrastive learning further comprises: an optimization module configured to optimize learning representation of the comparative positive sample pairs and negative sample pairs at the node-graph level, node-neighbor level, and node-node level, wherein an optimized loss function is:

$$L = L_{graph} + \lambda L_{neighbor} + \gamma L_{vertex}$$

wherein λ and γ represent predefined hyper-parameters that balance the importance of the three parts.

Compared with the prior art, this embodiment has the following beneficial effects:

1) processing graph representation learning more naturally in unsupervised scenarios: L loss accomplishes graph contrastive learning by exploring information from the data itself without any label guidance;

2) better comprehensiveness: The internal structure information of the whole graph is revealed in a hierarchical way. Instead of performing graph mutual information operations in a fixed mode, the framework implicitly estimates mutual information from different ranges, thereby extracting more comprehensive information by gradually exploiting node-graph level, node-neighbor level and node-node level relationships; and 3) better discriminability: the learning process of hierarchical mutual information estimation and mutual information-based hard sample mining is unified, so that nodes that are easy to distinguish are filtered, the network pays more attention to the hard nodes, and the discrimination capability of the network is improved.

Correspondingly, this embodiment further provides a citation network graph representation learning method based on multi-view contrastive learning, which comprises:

S1: taking a corresponding original graph node representation in a citation network graph as a positive sample, and constructing a corresponding negative sample based on an original graph;

S2: enhancing a graph structure and an initial node feature of the positive sample based on a personalized page ranking algorithm and a Laplacian smoothing algorithm, so as to obtain a positive sample graph and a negative sample graph related to a positive sample node set;

S3: extracting a positive sample graph representation and a negative sample graph representation based on a GCN encoder, integrating the positive sample graph representation and the negative sample graph representation, and obtaining a consensus representation of the positive sample graph and the negative sample graph by means of a cross view concentration fusion layer;

S4: comparing learning representations of positive sample pairs constructed by nodes in the positive sample graph and negative sample pairs constructed by nodes in the negative sample graph by means of a discriminator; and

S5: representing the consistency between the negative sample pairs according to a pre-calculated affinity vector, and selecting and reserving nodes that have more difficulty in expressing global or neighbor information according to the calculated and obtained affinity vector, so as to achieve more comprehensive graph representation learning.

Embodiment 2

The citation network graph representation learning system based on multi-view contrastive learning provided by this embodiment is different from Embodiment 1 in that:

in order to evaluate the effectiveness of the proposed MHGI, extensive experiments are performed on six widely used datasets, including Coral, Citeseer1, Pubmed1, Amap2, Amac2, and Corafull3. For Cora, CiteSeer, and PubMed datasets, the same training/validation/testing partitioning is used, as described in [Thomas N. Kipf and Max Welling. 2017. Semi-Supervised Classification with Graph Convolutional Networks. In Proceedings of the International Conference on Learning Representations]. For the other three datasets (i.e., Amap, Amac, and Corafull), since they have no common partitioning criteria available, random partitioning is used, with 7%, 7%, and the remaining 86% of the nodes selected as training, validation, and test sets, respectively.

The node classification precision comparison (mean±standard deviation) for the different methods on the six datasets is shown in Table 1. In the table, the second column represents the inputs used by each method in the training process, wherein X, A, and Y represent the feature matrix, adjacency matrix, and label, respectively. The best results are shown in bold. OOM means insufficient memory.

TABLE 1

| Method | Input X | Input A | Input Y | Cora | Citeseer | Pubmed | Amap | Amac | Corafull |
|---|---|---|---|---|---|---|---|---|---|
| Raw Features | ✓ | | | 47.8 ± 0.2 | 61.5 ± 0.0 | 67.8 ± 0.2 | 84.8 ± 0.3 | 78.4 ± 0.2 | 33.3 ± 0.1 |
| Deepwalk | | ✓ | | 66.8 ± 1.1 | 47.1 ± 0.8 | 65.5 ± 0,8 | 91.4 ± 0.5 | 87.0 ± 0.2 | 51.5 ± 0.1 |
| NodetoVec | | ✓ | | 68.8 ± 1.1 | 48.1 ± 1.4 | 70.8 ± 1.2 | 90.3 ± 0.2 | 86.2 ± 0.2 | 51.3 ± 0.2 |
| GCN | ✓ | ✓ | ✓ | 80.4 ± 0.0 | 70.4 ± 0.0 | 78.8 ± 0.0 | 92.2 ± 0.0 | 87.7 ± 0.0 | 54.9 ± 0.0 |
| GAT | ✓ | ✓ | ✓ | 82.7 ± 0.4 | 72.3 ± 0.8 | 79.1 ± 0.5 | 92.6 ± 0.3 | 86.9 ± 0.4 | OOM |
| SS-GCN-Clu | ✓ | ✓ | ✓ | 81.3 ± 0.0 | 70.6 ± 0.0 | 76.9 ± 0.0 | 90.5 ± 0.0 | 84.7 ± 0.1 | 52.3 ± 0.0 |
| SS-GCN-Par | ✓ | ✓ | ✓ | 79.8 ± 0.0 | 71.3 ± 0.0 | 80.0 ± 0.0 | 90.5 ± 0.0 | 85.2 ± 0.0 | 51.4 ± 0.0 |
| SS-GCN-Comp | ✓ | ✓ | ✓ | 80.7 ± 0.0 | 71.3 ± 0.0 | 78.7 ± 0.0 | 91.4 ± 0.0 | 86.8 ± 0.0 | 55.3 ± 0.0 |
| VGAE | ✓ | ✓ | | 71.5 ± 1.7 | 62.0 ± 1.6 | 73.4 ± 1.5 | 89.6 ± 1.0 | 80.6 ± 1.1 | 50.4 ± 1.0 |
| AGE | ✓ | ✓ | | 72.8 ± 0.6 | 69.5 ± 0.7 | 66.7 ± 0.8 | 88.9 ± 0.9 | 82.6 ± 1.2 | 51.5 ± 0.7 |
| DGI | ✓ | ✓ | | 82.2 ± 0.6 | 71.8 ± 0.7 | 77.4 ± 0.8 | 91.5 ± 0.2 | 86.9 ± 0.5 | 53.4 ± 2.4 |
| GMI | ✓ | ✓ | | 82.4 ± 0.8 | 72.9 ± 0.3 | 79.7 ± 0.5 | 87.2 ± 0.0 | 70.4 ± 0.7 | 53.8 ± 2.1 |
| MVGRL | ✓ | ✓ | | 83.4 ± 0.5 | 72.3 ± 0.5 | 78.9 ± 0.6 | 91.9 ± 0.2 | 87.0 ± 0.2 | 54.0 ± 1.2 |
| Ours | ✓ | ✓ | | 84.0 ± 0.3 | 73.5 ± 0.4 | 80.4 ± 0.5 | 92.6 ± 0.2 | 87.8 ± 0.1 | 56.0 ± 0.8 |

Setting Parameters:

Training process: this method is achieved by a PyTorch platform and an NVIDIA 3090 GPU. The proposed training of the MHGI comprises the following two steps. First, the entire unsupervised graph representation learning framework is trained, and the graph representation is optimized for at least 120 iterations by minimizing the contrastive loss function L(·). Secondly, DGI [Petar Velickovic, William Fedus, William L. Hamilton, Pietro Liò, Yoshua Bengio, and R. Devon Hjelm. 2019. Deep Graph Infomax. In_Proceedings of the International Conference on Learning Representations] is followed and a simple logistic regression classifier is trained for at least 50 iterations until convergence to evaluate the quality of the graph representation generated on a semi-supervised node classification task. For all methods of comparison, each experiment is repeated 10 times in order to mitigate the adverse effects of randomness, and the mean values and corresponding standard deviations are reported.

Implementation details: the process of view construction comprises the following two steps. First, MVGRL [Kaveh Hassani and Amir Hosein Khas Ahmadi. 2020. Contrastive Multi-View Representation Learning on Graphs. In Proceedings of the International Conference on Machine Learning. 4116-4126] is followed and the augmentation is applied to the adjacency matrix by graph diffusion to generate a structurally augmented adjacency matrix $\tilde{A}_{PPR}$:

$$\tilde{A}_{PPR} = \alpha\left(I_n - (1-\alpha)\tilde{A}\right)^{-1}$$

Next, in order to filter out high frequency signals while retaining low frequency signals, AGE [Ganqu Cui, Jie Zhou, Cheng Yang, and Zhiyuan Liu. 2020. Adaptive Graph Encoder for Attributed Graph Embedding. In_Proceedings of the ACM SIGKDD Conference on Knowledge Discovery and Data Mining. 976-985] is followed and a Laplacian smoothing filter is used to generate feature enhancement attribute matrix $X_L$:

$$H = I - m(\tilde{D} - \tilde{A})$$

$$X_L = H^t X$$

wherein $\tilde{D}$ represents a degree matrix of a normalized adjacency matrix $\tilde{A}$; t represents a frequency of the Laplacian smoothing filter and is initialized to 1. M represents a real value that is set to ⅔.

The dual-view formulas $G^1=(X,\tilde{A})$ and $G^2=(X_L, \tilde{A}_{PPR})$ are trained by adopting a dual single-layer GCN with 512 latent dimensions as an encoder of this method and using the Adam optimizer for ablation study. In order to avoid overfitting, this method adopts an early stopping strategy, namely, optimization is stopped when the verification loss reaches a steady state. For all datasets, the learning rates of the proposed MHGI and the logistic regression classifier are set to $1e^{-3}$ and $1e^{-2}$, respectively. According to the results of the parameter sensitivity test, two balanced hyperparameters γ and λ are fixed to 1. Due to the large scale of Pubmed, Amap, Amac, and Corafull, it is necessary to use the subsampling techniques introduced in MVGRL [Kaveh Hassani and Amir Hosein Khas Ahmadi. 2020. Contrastive Multi-View Representation Learning on Graphs. In_Proceedings of the International Conference on Machine Learning. 4116-4126] to make these datasets suitable for GPU memory. Furthermore, performance in classification accuracy is evaluated in these experiments.

Performance Comparison:

In this section, this method is compared with several of the most advanced methods to demonstrate its effectiveness. Among them, Deepwalk [Bryan Perozzi, Rami Al-Rfou, and Steven Skiena. 2014. DeepWalk: online learning of social representations. In_Proceedings of the ACM SIGKDD Conference on Knowledge Discovery and Data Mining. 701-710] and Nodeto Vec [Aditya Grover and Jure Leskovec. 2016. node2vec: Scalable Feature Learning for Networks. In Proceedings of the ACM SIGKDD Conference on Knowledge Discovery and Data Mining. 855-864] are representatives of the classic unsupervised graph representation learning (UGRL) method. VGAE [Thomas N. Kipf and Max Welling. 2016. Variational Graph Auto-Encoders.ArXivabs/1611.07308 (2016)] and AGE [Ganqu Cui, Jie Zhou, Cheng Yang, and Zhiyuan Liu. 2020. Adaptive Graph Encoder for Attributed Graph Embedding. In Proceedings of the ACM SIGKDD Conference on Knowledge Discovery and Data Mining. 976-985] represent reconstruction-based UGRL methods, which learn graph representations for downstream tasks by reconstructing both input and output. DGI [Petar Velickovic, William Fedus, William L. Hamilton, Pietro Liò, Yoshua Bengio, and R. Devon Hjelm. 2019. Deep Graph Infomax. In Proceedings of the International Conference on Learning Representations], GMI [Zhen Peng, Wenbing Huang, Minnan Luo, Qinghua Zheng, Yu Rong, Tingyang Xu, and Junzhou Huang. 2020. Graph Representation Learning via Graphical Mutual Information Maximization. In Proceedings of the International Conference_on World Wide Web. 259-270], and MVGRL [Kaveh Hassani and Amir Hosein Khas Ahmadi. 2020. Contrastive Multi-View Representation Learning on Graphs. In Proceedings of the International Conference on Machine Learning. 4116-4126] are typical UGRL frameworks based on graph contrastive learning. In these methods, the graph representation is learned by attribute and structure information by distinguishing positive sample pairs from negative sample pairs based on mutual information estimation. In order to directly compare this method with supervised methods, the performance of GCN [Thomas N. Kipf and Max Welling. 2017. Semi-Supervised Classification with Graph Convolutional Networks. In Proceedings of the International Conference on Learning Representations], GAT [Petar Velickovic, Guillem Cucurull, Arantxa Casanova, Adriana Romero, Pietro Liò, and Yoshua Bengio. 2018. Graph Attention Networks. In Proceedings of the International Conference on Learning Representation], and SS-GCNs [Yuning You, Tianlong Chen, Zhangyang Wang, and Yang Shen. 2020. When Does Self-Supervision Help Graph Convolutional Networks?. In Proceedings of the International Conference on Machine Learning. 10871-10880] are reported, which train the network in an inductive manner for node classification. In particular, the provided results are used to train a logistic regression classifier on original features.

Table 1 gives a comparison of the precision performance of the above methods. From this Table 1, this embodiment has the following observation results:

1) In most cases, MHGI shows superior performance relative to the comparative method. In particular, Deepwalk and Nodeto Vec use graph structure information based only on DFS (depth first sampling) strategy content, only a few nodes close to the source node will be sampled, and thus local structure information is easily ignored. Furthermore, these methods rarely consider attribute information, resulting in poor performance. In contrast, the MHGI makes full use of available information of graph structure and node attributes, greatly improving network performance.
2) Reconstruction-based UGRL methods such as VGAE and AGE cannot be compared with this method because these methods overemphasize the quality of reconstruction information and suffer from unstructured predictions. The MHGI does not reconstruct all the information equally, but optimizes the contrast objective by predicting the consistency between two representations in the graph, where consistency between samples with similar semantic information is maximized, and consistency between samples with irrelevant semantic information is minimized. The proposed MHGI thus improves the precision performance of existing reconstruction-based UGRL methods.
3) Compared with GCL-based methods, the proposed MHGI is always better and achieves the optimal precision performance. For example, MVGRL is considered to be the strongest baseline among GCL-based unsupervised graph representation learning methods. For all benchmark datasets ACC, the proposed MHGI exceeds 0.6%, 1.2%, 1.5%, 0.7%, 0.8%, and 2.0%. These results verify the effectiveness of the proposed framework and demonstrate that the hierarchical mutual information estimation strategy and mutual information-based hard sample mining module of the present method can help improve the discrimination capability of graph representation by collecting and reserving more comprehensive information from different scopes.
4) The method is also compared with five supervised graph representation learning methods, including three variants of GCN, GAT and SS-GCN: SS-GCN-Clu, SS-GCN-Par, and SS-GCN-Comp. Without any label guidance, this method shows comparable results to some supervised methods (such as GCN and GAT), even outperforms them on the Cora and Citeseer datasets. It is hypothesized that these benefits stem from the fact that the MHGI graph representation learned by hierarchical mutual information estimation and mutual information-based hard sample mining module inherits the rich structural information and latent semantic properties of the original graph. The graph representation of these supervised methods, rather than exploring rich information from the data itself, learns and optimizes under the direction of an extremely sparse supervisory signal, which may be threatened by overfitting and result in suboptimal performance.

It should be noted that the foregoing are merely some embodiments of the present application and applied technical principles. Those skilled in the art may understand that the present application is not limited to specific embodiments described herein, and those skilled in the art may make various significant changes, readjustments, and replacements without departing from the protection scope of the present application. Therefore, although the present application is described in detail by using the foregoing embodiments, the present application is not limited to the foregoing embodiments, and may further include more other equivalent embodiments without departing from the concept of the present application. The scope of the present application is determined by the scope of the appended claims.

What is claimed is:

1. A citation network graph representation learning system based on multi-view contrastive learning, comprising:

a sample construction module configured to take a corresponding original graph node representation in a citation network graph as a positive sample, and construct a corresponding negative sample based on an original graph;

a graph enhancement module configured to enhance a graph structure and an initial node feature of the positive sample based on a personalized page ranking algorithm and a Laplacian smoothing algorithm to obtain a positive sample graph and a negative sample graph related to a positive sample node set;

a fusion module configured to extract a positive sample graph representation and a negative sample graph representation based on a GCN encoder, integrate the positive sample graph representation and the negative sample graph representation, and obtain a consensus representation of the positive sample graph and the negative sample graph by means of a cross view concentration fusion layer;

a mutual information estimation module configured to compare learning representations of positive sample pairs constructed by nodes in the positive sample graph and negative sample pairs constructed by nodes in the negative sample graph by means of a discriminator; and a hard sample mining module configured to represent the consistency between the negative sample pairs according to a pre-calculated affinity vector and select and reserve nodes that have more difficulty in expressing global or neighbor information according to the calculated and obtained affinity vector to achieve more comprehensive graph representation learning.

2. The citation network graph representation learning system based on multi-view contrastive learning according to claim 1, wherein the comparing learning representations of the positive sample graph and the negative sample graph by means of a discriminator by a mutual information estimation module comprises: comparing learning representations of the positive sample pairs and the negative sample pairs by means of node-graph level, node-neighbor level, and node-node level.

3. The citation network graph representation learning system based on multi-view contrastive learning according to claim 2, wherein the comparing learning representations of the positive sample pairs and the negative sample pairs by means of the node-graph level comprises:

encoding global information of the positive sample graph by using an R function, which is represented as:

$$s^v = R(Z^v)$$

wherein $Z^v$ represents a positive sample graph representation of the $v^{th}$ view extracted by a graph encoder;

calculating a probability score assigned to the positive sample graph, which is represented as:

$$D(z_i, s^v) = \sigma\left(z_i^T W s^v\right)$$

wherein D represents a discriminator; $z_i$ represents a positive sample;

$$z_i^T$$

represents node information for encoding; $s^v$ represents global information of positive sample pairs for encoding; σ represents an activation function; and w represents a learnable tensor;

calculating mutual information between the positive sample pairs and mutual information between the negative sample pairs in all views, which is represented as:

$$L_{graph} = -\frac{1}{N+M}\sum_{v=1}^{V}\left(\sum_{i=1}^{N} E_{(X^V,A^V)}\left[\log D\left(z_i, s^V\right)\right] + \sum_{i=1}^{M} E_{(\hat{X}^v,A^v)}\left[\log\left(1 - D\left(\hat{z}_i, s^V\right)\right)\right]\right)$$

wherein $$\sum_{i=1}^{N} E_{(X^v,A^v)}[\log D(z_i, s^v)]$$

represents the affinity between nodes and the whole graph;

$$\sum_{i=1}^{N} E_{(\hat{X}^v,A^v)}[\log(1 - D(\hat{z}_i, s^v))]$$

represents a difference between any node and the whole graph; V represents the number of views; N and M represent the number of positive sample pairs and negative sample pairs, respectively; $X^v$ represents a feature matrix of the $v^{th}$ view; $A^v$ represents an adjacency matrix of the $v^{th}$ view; $\hat{X}^v$ represents a reconstructed feature matrix of the $v^{th}$ view; and $$\hat{z}_i$$

represents a negative sample.

4. The citation network graph representation learning system based on multi-view contrastive learning according to claim 2, wherein the comparing learning representations of the positive sample pairs and the negative sample pairs by means of the node-neighbor level comprises:

selecting a local structure A'v of nodes, enhancing the $v^{th}$ graph representation Z'v of the selected node, and calculating a local structure of the enhanced and selected node representation, which is represented as:

$$H'^v = \sigma(A'^v Z'^v)$$

wherein H'v represents the local structure of the enhanced and selected node representation; and σ represents an activation function;

calculating mutual information between the positive sample pairs and mutual information between the negative sample pairs in all views, which is represented as:

$$L_{neighbor} = -\frac{1}{N'+M'}\sum_{v=1}^{V}\left(\sum_{i=1}^{N'} E_{(X'^v,A'^v)}\left[\log D\left(z_i', h_j'^v\right)\right] + \sum_{i=1}^{M'} E_{(\hat{X}'^v,A'^v)}\left[\log\left(1 - D\left(\hat{z}_i', h_j'^v\right)\right)\right]\right)$$

wherein N' represents the number of sampled positive samples; M' represents the number of sampled negative samples; $X'^v$ represents a sampled feature matrix of the $v^{th}$ view; $A'^{v}$ represents a sampled adjacency matrix of the $v^{th}$ view; $\widehat{X'^{v}}$ represents a sampled reconstructed feature matrix of the $v^{th}$ view; $z_i'$ represents a positive sample node representation in the $v^{th}$ view;

$$h_j^{v'}$$

represents adjacent digests corresponding to node representations in the $v^{th}$ view; $\widehat{z_i}$ represents a negative sample node representation in the $v^{th}$ view; and $$h_j^{\prime v}$$

represents node neighbor information.

5. The citation network graph representation learning system based on multi-view contrastive learning according to claim 2, wherein the comparing learning representations of the positive sample pairs and the negative sample pairs by means of the node-node level comprises:

normalizing and representing the $v^{th}$ graph representation $Z^V$ by using an activation function, and calculating mutual information between graph representations of nodes, which is represented as:

$$L_{vector} = -\frac{1}{N'' + M''}\sum_{v=1}^{V}\left(\sum_{i=1}^{N''} E_{(X''v, A''v)}[\log D(z_i'', \sigma(z_k''^{v}))] + \sum_{k=1}^{M''} E_{(\widehat{X''^{v}}, A''^{v})}\left[\log\left(1 - D\left(\widehat{z_k}'', \sigma\left(z_k''^{v}\right)\right)\right)\right]\right)$$

wherein N" represents the number of subsampled positive samples; M" represents the number of subsampled negative samples; $X''^{v}$ represents a subsampled feature matrix of the $v^{th}$ view; $A''^{v}$ represents a subsampled adjacency matrix of the $v^{th}$ view;

$$z_i''$$

represents a subsampled center node representation;

$$z_k^{\prime\prime v}$$

represents a subsampled node representation; $\widehat{X''^{v}}$ represents a subsampled reconstructed feature matrix of the $v^{th}$ view; and $\widehat{z_k}''$ representing a subsampled negative node representation.

6. The citation network graph representation learning system based on multi-view contrastive learning according to claim 2, wherein the representing the consistency between the negative sample pairs according to a pre-calculated affinity vector, and selecting and reserving nodes that have more difficulty in expressing global or neighbor information according to the calculated and obtained affinity vector by a hard sample mining module to achieve more comprehensive graph representation learning comprises:

giving mutual information scores of positive sample pairs and negative sample pairs of two views for vectors, and performing linear combination operations on the vectors corresponding to the positive sample pairs and the negative sample pairs to obtain a consistent mutual information estimation vector, which is represented as:

$$s_{pos} = \alpha s_{pos1} + (1-\alpha)s_{pos2}$$

$$s_{neg} = \alpha s_{neg1} + (1-\alpha)s_{neg2}$$

wherein Spos and Sneg represent sub-vectors of the fused mutual information consistency; and α represents a learnable coefficient;

defining true labels of the positive sample pairs and negative sample pairs as 1 and 0, respectively;

sorting all nodes according to the affinity vector, and defining a node of top-K as a hard node according to an index of all nodes, which is represented as:

$$idx = \text{Top\_rank}((s_{neg} - s_{pos}), K)$$

wherein idx represents an index slice;

selecting positive sample pairs and negative sample pairs, which are represented as:

$$\tilde{p}^{+} = p_{idx}^{+}, \tilde{p}^{-} = p_{idx}^{-}$$

wherein $$\overline{p_i} = (\hat{z}_i, x_i)$$

represents negative example pairs;

$$p_i^{+} = (z_i, x_i)$$

represents positive sample pairs; $x_i$ represents a pre-assigned representation;

$$p_{id,x}^{+}$$

represents positive sample pairs; and $$\overline{p_{idx}}$$

represents negative sample pairs.

7. The citation network graph representation learning system based on multi-view contrastive learning according to claim 6, further comprising: an optimization module configured to optimize learning representation of the comparative positive sample pairs and negative sample pairs at the node-graph level, node-neighbor level, and node-node level, wherein an optimized loss function is:

$$L = L_{graph} + \lambda L_{neighbor} + \gamma L_{vertex}$$

wherein λ and γ represent predefined hyper-parameters.

8. The citation network graph representation learning system based on multi-view contrastive learning according to claim 1, wherein the GCN encoder in the fusion module is represented as:

$$f^{v}(\cdot):Z^{v} = f^{v}(G^{v}) = f^{v}(X^{v}, A^{v})$$

wherein $f^{v}(\cdot)$ represents an encoder; and $G^{v}$ represents an original graph set.

9. The citation network graph representation learning system based on multi-view contrastive learning according to claim 6, wherein before all nodes are sorted according to the affinity vector, a set of affinity vectors are obtained by subtracting Spos from Sneg.

10. A citation network graph representation learning method based on multi-view contrastive learning, comprising:

S1: taking a corresponding original graph node representation in a citation network graph as a positive sample, and constructing a corresponding negative sample based on an original graph;

S2: enhancing a graph structure and an initial node feature of the positive sample based on a personalized page ranking algorithm and a Laplacian smoothing algorithm to obtain a positive sample graph and a negative sample graph related to a positive sample node set;

S3: extracting a positive sample graph representation and a negative sample graph representation based on a GCN encoder, integrating the positive sample graph representation and the negative sample graph representation, and obtaining a consensus representation of the positive sample graph and the negative sample graph by means of a cross view concentration fusion layer;

S4: comparing learning representations of positive sample pairs constructed by nodes in the positive sample graph and negative sample pairs constructed by nodes in the negative sample graph by means of a discriminator; and S5: representing the consistency between the negative sample pairs according to a pre-calculated affinity vector and selecting and reserving nodes that have more difficulty in expressing global or neighbor information according to the calculated and obtained affinity vector, so as to achieve more comprehensive graph representation learning.

* * * * *